Feb. 1, 1966 L. F. YNTEMA 3,232,749
PRODUCTION OF REFRACTORY METALS
Filed April 30, 1962
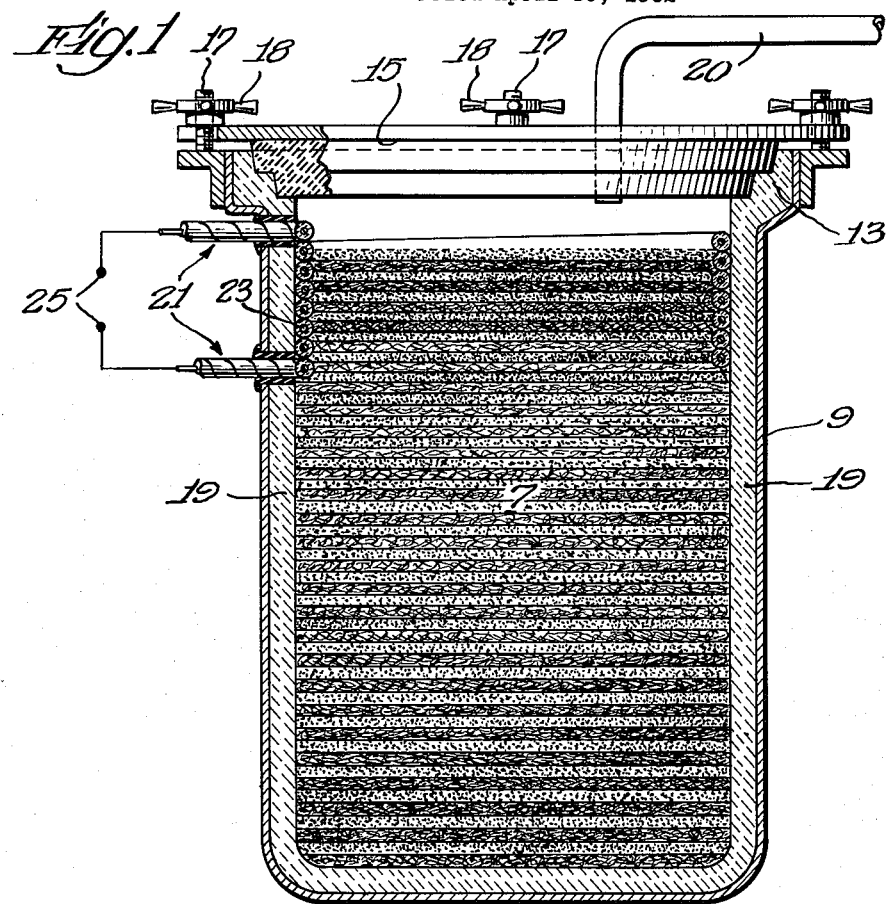
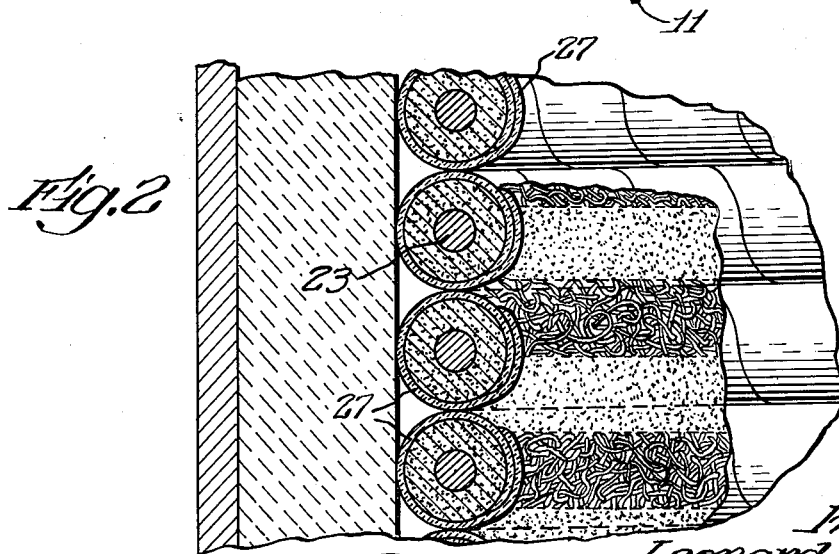
Inventor:
Leonard F. Yntema United States Patent Office 3,232,749
Patented Feb. 1, 1966

3,232,749
PRODUCTION OF REFRACTORY METALS
Leonard F. Yntema, R.R. 1, Box 159, Wadsworth, Ill.
Filed Apr. 30, 1962, Ser. No. 191,227
11 Claims. (Cl. 75—84)

The present invention generally relates to refractory metals and more particularly relates to the production of solid masses of refractory metals, especially columbium and tantalum, in purified form.

For both research and commercial purposes it is highly desirable to be able to produce refractory metals in purified form. Refractory metals have been increasingly utilized in high temperature applications, as for example, jet engine components, reactor vessels, missile components, etc. due to their high temperature strength and high melting points. Several processes have been recently developed for the production of relatively pure forms of columbium and tantalum, still containing however, some trace metals and other impurities. One type of process utilizes an active metal for the reduction of oxides or halides of columbium and tantalum to the metallic state. For example, metallic sodium has been reacted with the double potassium fluorides or other halides of columbium or tantalum to yield columbium or tantalum only in fine powder form. As another example, metallic aluminum has been employed to reduce the double potassium fluorides of columbium or tantalum to free powder metal. In both such procedures, a considerable number of treatment steps are involved, in which the production of the columbium or tantalum in powder form presents certain technical difficulties. Thus, the fine metal powder so produced must be purified by leaching or washing operations to remove reaction products. However, such leaching and washing operations are complicated by the fact that some of the columbium or tantalum powder, which is of very small size, is likely to be lost in such operations, or, at best, can only be recovered by further treating steps. Moreover, since the columbium or tantalum powder has a large surface area per unit weight, it has a high absorptive capacity for impurities and the washing or leaching operations must be relatively extensive in order to sufficiently purify the columbium or tantalum powder.

In addition, although columbium and tantalum powder may be preferred for fabrication into specialty items, such as electric capacitors, and the like, conversion of the powder into massive metal in most instances presents considerable technical problems.

Accordingly, it would be desirable to provide a means for producing relatively pure columbium and tantalum, from compounds thereof, particularly if the product were in metal form of substantial size, more readily susceptible to easy fabrication to desired end products, rather than in fine powder form.

Such means have now been discovered, which means include a method having the indicated advantages of simplicity, low cost and effectiveness and which also includes as an optional step, the removal of the small traces of metals which may be present in the already purified product, so that columbium or tantalum can be prepared in massive form which can be for practical purposes, completely free of metallic impurities. Such means also include apparatus in which the method can be conveniently carried out.

Accordingly, it is the principal object of the present invention to provide means for producing refractory metals in relatively pure form. It is also an object of the present invention to provide a method of producing refractory metals, particularly columbium and tantalum, in purified massive form. It is a further object of the present invention to provide a simplified, economical method of producing high yields of purified columbium and tantalum.

It is a still further object of the present invention to provide a method of producing highly purified massive columbium and tantalum. It is also an object of the present invention to provide apparatus in which the method of the present invention can be advantageously carried out.

Further objects and advantages of the present invention will be apparent from a study of the following detailed description and of the accompanying drawings of which:

FIGURE 1 is a vertical section of a preferred type of reaction vessel of the present invention for carrying out the method of the present invention; and FIGURE 2 is an enlarged fragmentary view of a portion of the vessel of FIGURE 1, illustrating preferred means for initiating the desired metal-yielding reaction.

The present invention includes a method whereby refractories, such as columbium and tantalum, in oxide form can be conveniently and efficiently reduced to the respective purified metals, i.e., columium and tantalum.

It will be understood that although the following description is, in part, directed to the method of producing columbium and tantalum, the method is generally applicable to the production of purified masses of other refractory metals such as titanium, zirconium, vanadium, chromium, molybdenum and tungsten. The method includes reacting columbium or tantalum oxide in a suitable closed reaction zone with one or more rare earth metals, preferably one or more of the cerium group rare earth metals, as for example, misch metal (a mixture of cerium group metals). Such rare earth metals exhibit high heats of formation of their oxide forms. The reaction, once initiated, is thus self-sustaining, being exothermic, and results in the production of purified columbium or tantalum, plus a slag comprising the oxides of the cerium group metal or metals. Additives may be present during the reaction to facilitate fluid slag formation. The slag is easily separated from the purified columbium or tantalum, since the desired metal is in the form of masses of substantial size, i.e., buttons or reguli, rather than powder. Only traces of the cerium group metals are present in the purified columbium or tantalum. Further purification of the columbium or tantalum can be accomplished by remelting under controlled conditions.

Now referring more particularly to the steps of the method of the present invention, columbium oxide, usually in the pentoxide form, although the dioxide $CbO_2$ and monoxide $CbO$ forms are not excluded, is disposed in particulate form in a suitable reaction zone, together with a selected reducing agent comprising one or more rare earth metals. Preferably, such rare earth metals are of the cerium group comprising those metals of atomic numbers from 57 to 63. Specifically, cerium, lanthanum, praseodymium, neodymium, samarium and europium are the cerium group metals. Less satisfactorily, members of the gadolinium group of rare earth metals (atomic numbers 64–71), including gadolinium, terbium, dysprosium, holmium, erbium, thulium, ytterbium and lutecium can be used, or mixtures of one or more metals of either or both indicated groups of rare earth metals. As a preferred species, the mixture of cerium group rare earth metals known as misch metal is employed.

The high heats of formation of the rare earth metal oxides, particularly those of the cerium group, are advantageously employed during the reaction in the present method to provide the high heat required to melt the columbium formed during the reaction into masses of substantial size (buttons or reguli) for easy separation from the by-products (rare earth oxides). The rare earth metals have the added advantage of having low mutual solubility with respect to columbium and tantalum, so that the columbium and tantalum formed during the reduction reaction do not pick up in solution more than a trace of the rare earth metals.

The reducing agent, i.e., rare earth metals, should be present in the reaction zone in an amount at least sufficient to react with all the columbium oxide present, i.e., in an at least equivalent amount. Preferably, the rare earth metals are present in an amount of from about 2 to about 5 percent, by weight, in excess of the equivalent amount, to further assure complete reduction of all columbium oxide to columbium metal. The reducing agent is present in particulate form, preferably metal turnings.

Additives (slagging agents) which aid in the formation of fluid slag, for example, potassium fluoride, sodium, fluoride, etc., may be added to the reaction zone in a minor amount, preferably from about 2 to about 5 percent, by weight of the combined weight of the columbium oxide and reducing agent.

The reaction zone preferably comprises one such as is illustrated in the accompanying drawings and which forms part of this invention. Thus, FIGURE 1 illustrates a reaction apparatus 7 comprising a metal reaction vessel 9 largely fabricated of, for example, steel and in the form of a cylinder closed at the bottom end 11 thereof and fitted at the open opposite end 13 thereof, with a lid 15 releasably secured thereto, as by threaded bolts 17 and winged nuts 18. The inner surface of the vessel 9, including the lid 15, is lined with a jacket 19 fabricated of one or more rare earth oxides, which jacket 19 acts as a heat insulator and which also prevents contamination of the product (columbium) with iron, etc. from the vessel 9.

The step of disposing the columbium oxide, reducing agent (rare earth metals) and, optionally, the slagging agent in the reaction vessel 9 could be carried out in any suitable manner to facilitate intimate contact between the indicated constituents. However, it is preferred to arrange the columbium oxide and reducing agent with respect to each other so as also to facilitate formation of the columbium as reguli or buttons of appreciable size. This can be readily accomplished by disposing the columbium oxide and the reducing agent in alternate layers, as illustrated in FIGURES 1 and 2, preferably until the whole vessel 9 is substantially completely filled. The thickness of the respective layers can vary, as dictated by the requirements for good contact between the reducing agent and columbium oxide and formation of reguli or buttons of columbium of substantial size. Ordinarily, the layers are from about ⅛ inch to about ½ inch thick. Thicker or thinner layers are also suitable.

An air space in vessel 9 may be provided. But the interior of vessel 9 is preferably connected to a vacuum line 20, as shown in FIGURE 1, which may extend down and a vacuum through lid 15, for example, about 50 microns pressure, may be drawn so as to avoid build-up of internal pressure generated by the heat of reaction and also to reduce side reactions such as the formation of oxides and nitrides of columbium, etc. Preferably, the slagging agent, when present, is disposed in the reducing agent layers, intimately mixed with the reducing agent.

In order to carry out the desired reaction it is only necessary to dispose the constituents within vessel 9, secure the lid 15 in place as by bolts 17 and nuts 18, and initially heat a portion of the reactants to the required reaction temperature. This can be accomplished by any suitable heating means, preferably disposed within vessel 9 because of the presence of insulating jacket 19. A preferred means 21 for such initial heating is indicated in FIGURES 1 and 2 and comprises a wire 23, which may be flat or round as shown in FIGURE 2, of the metal to be produced, columbium, helically disposed in the upper portion of vessel 9 adjacent jacket 19 and electrically connected through the wall of the vessel 9 to an external current supply (generally indicated as 25 in FIGURE 1).

A mixture of magnesium in particulate form (preferably fine powder) and a source of oxygen, preferably columbium oxide, may be held in position around the wire 23 by magnesium foil 27. Electrical insulators 29 may be provided around the wire 23 as it passes through the vessel wall. In initiating the reaction, the wire 23 is temporarily resistance heated to above the ignition point of the magnesium powder, which is below about 650° C., at which point burning of the magnesium occurs with the elaboration of heat sufficient to raise the temperature of the reducing agent and columbium oxide in the layers adjoining the wire to the temperature required for the desired oxidation-reduction reaction. Several of the rare earth metals (e.g. praseodymium and neodymium, etc.) have ignition points from about 200 to 400° C. and when ignited generate high heat so that only a relatively low initial temperature is required to begin the reaction. The reaction between the reducing agent and columbium oxide is thus initiated in the layers near the wire 23, oxidation of the rare earth metals to their oxides and simultaneous reduction of the columbium oxide to columbium metal being effected.

Such reaction, as indicated, is highly exothermic, the heat of formation of the rare earth oxides being sufficiently large not only to sustain the reaction and spread it throughout the closed vessel 9 but also to result in melting of the columbium metal (melting point 2415° C.) so formed by the reaction. Thus, the heat supplied by the heating means 21 need only be temporary, the oxidation-reduction reaction then spreading from the layers adjoining means 21, to eventually include the entire mass of constituents in vessel 21. Cooling means may be provided (not shown) as, for example, forced air, cooling coils, etc. whereby the temperature of the walls of vessel 9 can be regulated during the exothermic reaction in order to prevent softening thereof.

The columbium metal within the vessel melts in the layers in which it is formed from columbium oxide, and tends to flow together to form the desired masses of substantial size, that is, the reguli or buttons. Such melting of the columbium metal also tends to exclude from the columbium minor amounts of occluded gases and other impurities initially present in the columbium oxide charge.

According, some of the benefits of a separate melting step for purification of the columbium, as is required with certain conventional processes, are achieved inherently in the oxidation-reduction step of the present method.

The rare earth oxides so formed during the reaction also melt, as for example, ceric oxide at 1950° C. and, preferably with the aid of the slagging agent, form fluid slag. It will be understood that the heat elaborated during the described reaction is also high enough to melt tantalum (M.P. 3000° C.) where tantalum oxide is substituted for columbium oxide in the described reaction zone.

Once the oxidation-reduction reaction is completed, usually within a few minutes, but varying in time according to the size of the mass reacted, the particular constituents, the location of the mass initially reacted, etc., the reacted mass is then allowed to cool to ambient temperature. The lid 15 is then removed from the vessel 9 and the reacted mass removed. Since the purified columbium is largely in the form of buttons or reguli and is to a considerable extent located in separate layers from the slag (rare earth oxides plus slagging agent, where the latter is used), it is relatively easy to separate the columbium from the slag, as by sifting, etc. for substantially complete recovery thereof.

The columbium metal thus produced is highly purified in that it contains only traces of impurities, essentially the rare earth metals comprising the reducing agent, and is suitable for commercial and experimental uses without further treatment.

It will be understood that the identical method described for the production of columbium is equally applicable in the production of purified tantalum in massive form from tantalum oxide, whether in the dioxide ($Ta_2O_2$), tetraoxide ($Ta_2O_4$) or usual pentoxide ($Ta_2O_5$) form, or any mixture thereof. The reducing agent is as described for the columbium production procedure. So also is the slagging agent. The preferred reaction-initiating heating means comprises, however, a tanalum wire, around which is disposed a powdered mixture of magnesium and tantalum oxide, enclosed in magnesium foil.

The metal product of the described reaction, whether columbium or tanalum, can be further purified by removal of the trace metals therein during an optional remelting step, utilizing any suitable melting means. However, it is preferred that the remelting step be carried out utilizing electron beam melting in a high vacuum, such as less than about 1 micron pressure and preferably less than 0.1 micron pressure.

It has been found that this procedure is very much more efficient than other purification procedures and results in a product which, for all practical purposes, is free of all impurities.

Any suitable conventional electron beam remelting apparatus can be utilized for such purposes. Accordingly, a description of such apparatus will not be given hereinafter. The kinetic energy of the electrons bombarding the metal is converted into heat to melt the metal. In carrying out this step of the present method, the columbium or tantalum produced by the previously described steps is heated to above the vaporization point (at the high vacuum) of the trace rare earth metals in the columbium or tantalum and above the melting point of the tantalum or columbium but below the vaporization point of the columbium or tantalum and is maintained at such temperature until the trace metals are removed therefrom. In operating the electron beam apparatus it is important to maintain the high vacuum throughout such step and to remove the vaporized trace metals from the system sufficiently rapidly to prevent build-up of sufficient ionization in the apparatus to short circuit the system. Ordinarily, the rare earth metals in the columbium or tantalum are present in sufficiently low concentrations so that no short circuiting problems arise. The low concentration of the rare earth metals in the columbium and tantalum produced by the present method is due, as previously described, to the low mutual solubility of the rare earth metals with columbium and tantalum.

The described remelting step can thus be carried out until all traces of the rare earth metals and any other impurities of comparable or lower vaporization point are essentially completely removed from the columbium or tantalum, providing a final refractory metal product of substantially complete purity.

The following examples further illustrate certain features of the present invention.

EXAMPLE I

Technical grade columbium pentoxide, ($Cb_2O_5$) in powder form is disposed in a ceric oxide-lined steel reaction vessel, similar to that illustrated in FIGURES 1 and 2 and having the following dimensions: diameter, 10 inches; height, 12 inches.

A total of 25.7 pounds of the columbium oxide are used, disposed in layers of approximately ½ inch thick, alternating with layers of about the same thickness, comprising a mixture of misch metal turnings and 2 percent, of the combined weight of the columbium oxide and misch metal, of potassium fluoride powder. The total concentration of misch metal in the reaction vessel is 47.2 pounds, that is about 2 percent in excess of the equivalent weight of the columbium oxide. Substantially the entire reaction vessel is filled with the indicated constituents.

The reaction vessel also includes a helically wound columbium wire located adjacent the lining of the vessel in the upper portion thereof, around which wire is disposed a mixture of magnesium powder and columbium oxide wrapped in magnesium foil. The wire is connected to a power source external of the reaction vessel for resistance heating. The reaction vessel further includes a vacuum line, connected to a source of vacuum.

With the vessel lid secured in place, the interior of the vessel is evacuated to below 50 microns of pressure and then current is run through the wire and the magnesium powder is ignited. The heat elaborated by the magnesium powder is sufficient to cause ignition of misch metal rare earth metal components in the areas adjacent the wire. The temperature of the columbium oxide and misch metal in such areas increases to above the temperature (about 1200° C.) required for the oxidation-reduction reaction between the columbium oxide and misch metal. As the exothermic reaction is initiated and proceeds, the temperature in the reaction vessel rapidly increases, the oxidation-reduction reaction rapidly spreads throughout the vessel and sufficient heat is elaborated thereby to melt the formed rare earth oxides, slagging agent and also the formed columbium, i.e., the average temperature within the vessel is above 2500° C. During the reaction, a flow of cool air is directed against the outer surface of the steel vessel to maintain it below its softening point.

Within about 20 minutes, the reaction is completed. The reacted mass is then allowed to cool to ambient temperature (in about 8–10 hours), after which the vacuum is broken, the lid of the reaction vessel is removed, and the contents removed. The columbium is present in solid button form, having an average diameter of about ¼ inch. It is separated from the slag (misch metal oxides plus potassium fluoride) by crushing and tumbling, and is then retained for remelting. The columbium buttons have an average concentration of impurities of less than about 0.1 percent, by weight, said impurities essentially constituting misch metal rare earth metals.

The purified columbium buttons are then further purified in a conventional electron beam bombardment apparatus under a vacuum of less than about 0.1 micron. In such apparatus, the temperature of the columbium is rapidly increased to above the melting point thereof, that is, to about 2415° C. and is held at that temperature for about 2–5 minutes, to vaporize the misch metal and any other impurities which may be present, after which time the columbium is allowed to cool to ambient temperature. Determinations indicate the remelted solid mass of columbium is essentially completetly free of misch metal impurities (less than 0.001 percent) and thus is in very highly purified purified form.

EXAMPLE II

The same technique, as indicated in Example I, is applied to the preparation of purified tantalum from tantalum oxide, except that tantalum wire and tantalum oxide are used in place of columbium wire and columbium oxide. A total of 26.2 pounds of $Ta_2O_5$ are reacted with a total of 27.7 pounds of misch metal in an 8 inch by 10 inch vessel, substantially as described in Example I. The tantalum obtained from the reaction vessel in buttons has a purity of about 99.9 percent, by weight, and, as in Example I, is completely freed of misch metal by being heated to over 3000° C. in a vacuum of about 0.1 micron pressure by means of electron bombardment.

Examples I and II clearly indicate the ease, efficiency, rapidity, simplicity of the present method in preparing highly purified columbium and tantalum in massive forms rather than as difficult usable powder, from their respective oxides. Although the columbium and tantalum produced by the oxidation-reduction reaction step of the method are already highly purified and can be used without further treatment, the method preferably includes the optional final purification step of electron bombardment in a high vacuum to remove all traces of the reducing agent (rare earth metals) used in the method.

Arc melting and other procedures for remelting the reguli or buttons of columbium or tantalum produced in the method could be employed, if desired, in place of the electron bombardment procedure.

The present method extends to the production of other highly purified refractory metals, as well as columbium and tantalum. Other advantages are set forth in the foregoing.

Various of the features of the present invention are set forth in the appended claims.

What is claimed is:

1. A method of producing purified refractory metal, which method comprises the steps of disposing an oxide of a refractory metal in a closed reaction zone with a reducing agent essentially comprising at least one rare earth metal whose oxide has a sufficiently high heat of formation to sustain an oxidation-reduction reaction with said metal oxide and having sufficiently low mutual solubility with said metal so as to be present only in trace amounts in the purified metal, said reducing agent being present in a concentration to react with essentially all of said metal oxide, heating said metal oxide and said reducing agent in said zone to above the temperature required for initiating a self sustaining oxidation-reduction reaction therebetween, the temperature of the reaction being above the melting point of said metal, thereafter cooling said zone to ambient temperature, and separating said metal in solid massive form.

2. A method of producing purified refractory metal, which method comprises the steps of disposing an oxide of a refractory metal in layers in a closed reaction zone alternating with layers of reducing agent, said reducing agent essentially comprising at least one rare earth metal whose oxide has a sufficiently high heat of formation to sustain an oxidation-reduction reaction with said metal oxide and having a sufficiently low mutual solubility with said metal so that said rare earth metal is present in said purified metal only in trace amounts, said reducing agent being present in an amount sufficient to react with essentially all of said metal oxide, initiating a self sustaining oxidation-reduction reaction by externally heating said zone to above the tempertature required for said reaction, the temperature of the reaction being above the melting point of said metal, thereafter cooling said reaction zone below the melting point of said metal and recovering said metal in the form of solid buttons.

3. The method of claim 2, wherein a fluid slagging agent is incorporated in a minor concentration with the reducing agent before said oxidation-reduction reaction.

4. The method of claim 1, wherein said metal oxide is selected from the group consisting of columbium oxide and tantalum oxide.

5. The method of claim 2, wherein said metal oxide is selected from the group consisting of columbium oxide and tantalum oxide.

6. The method of claim 3, wherein said metal oxide is selected from the group consisting of columbium oxide and tantalum oxide.

7. The method of claim 6, wherein said reducing agent consists essentially of misch metal.

8. The method of claim 7, wherein said misch metal is present in a concentration of between about 2 and about 5 percent in excess of an amount required to substantially completely react with said metal oxide.

9. The method of claim 8, wherein said fluid slagging agent comprises potassium fluoride and is present in a concentration of between about 2 and about 5 percent, by combined weight of said metal oxide and said reducing agent.

10. A method of producing purified refractory metal, which method comprises the steps of disposing an oxide of a refractory metal selected from the group consisting of columbium and tantalum and a particulate reducing agent in a plurality of alternating generally horizontal layers within a closed reaction zone, said reducing agent comprising at least one rare earth metal having an atomic number of 57 to 63, said reducing agent being present in an amount of about 2 percent to about 5 percent in excess of the stoichiometric amount required to react with the metal oxide, maintaining a reduced pressure within the reaction zone, externally heating a portion of the reaction zone to above the reaction temperature to initiate a self sustaining oxidation-reduction reaction within the reaction zone and thereafter terminating the external heating, the reaction temperature being above the melting point of the metal, thereafter cooling the reaction zone and recovering the metal in the form of solid buttons.

11. The method of claim 10 wherein a slagging agent is present in the reducing agent layers in an amount of between about 2 percent and about 5 percent of the combined weight of the metal oxide and the reducing agent

References Cited by the Examiner

UNITED STATES PATENTS

| | | | |
|---|---|---|---|
| 1,673,043 | 6/1928 | Fischer | 74—84 |
| 2,271,838 | 2/1942 | Hanawalt | 13—20 |
| 2,404,060 | 7/1946 | Hall et al. | 13—20 |
| 2,902,360 | 9/1959 | Juda | 75—84 |
| 2,904,427 | 9/1959 | Edlin | 75—84 |
| 2,960,331 | 11/1960 | Hanks | 75—84 |
| 2,992,095 | 7/1961 | Li | 75—27 X |
| 3,016,296 | 1/1962 | Wong et al. | 75—84 |
| 3,083,094 | 3/1963 | Love | 75—84 |

CARL D. QUARFORTH, *Primary Examiner.*

REUBEN EPSTEIN, OSCAR R. VERTIZ, *Examiners.*